March 2, 1954
H. A. ROY, SR
2,670,638
DRILL AND REAMER GUIDE
Filed April 13, 1953
2 Sheets-Sheet 1
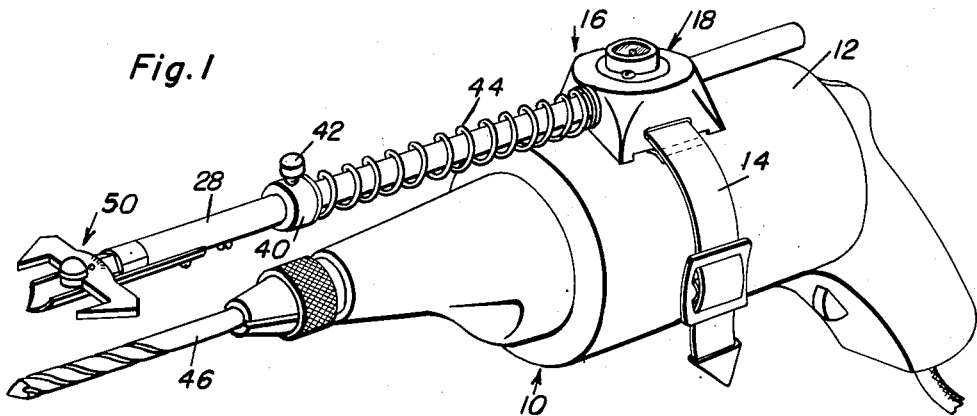
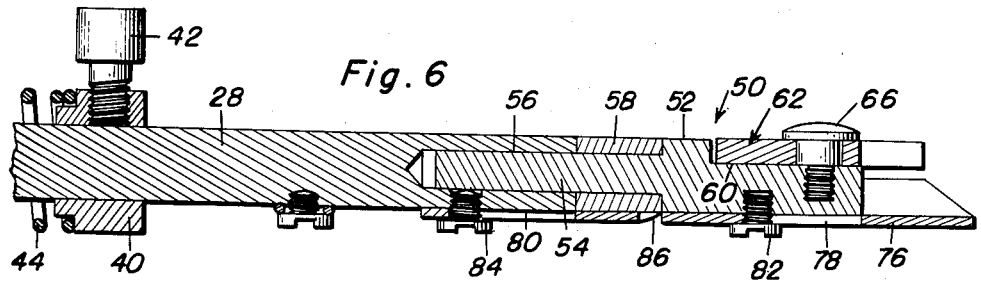
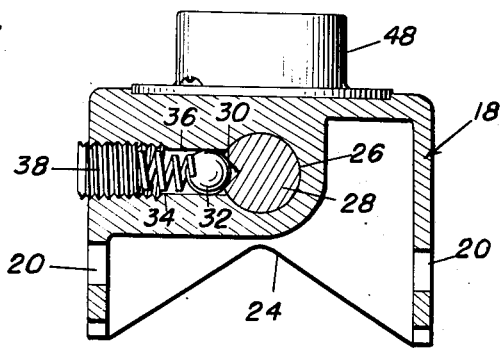
Henry A. Roy, Sr.
INVENTOR.
BY *Clarence A. O'Brien*
*and Harvey B. Jackson*
Attorneys March 2, 1954  H. A. ROY, SR  2,670,638
DRILL AND REAMER GUIDE
Filed April 13, 1953  2 Sheets-Sheet 2
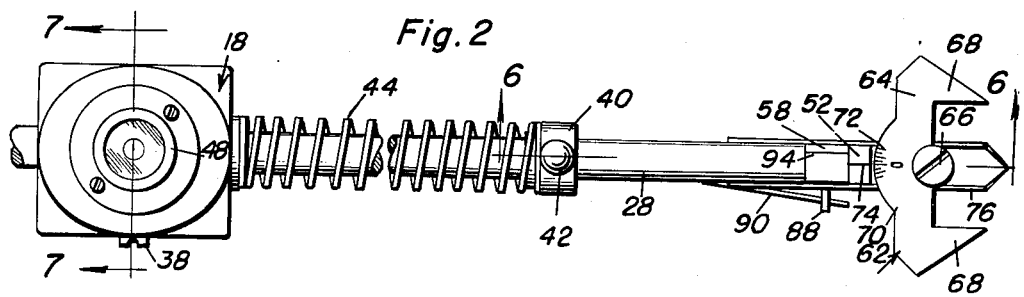
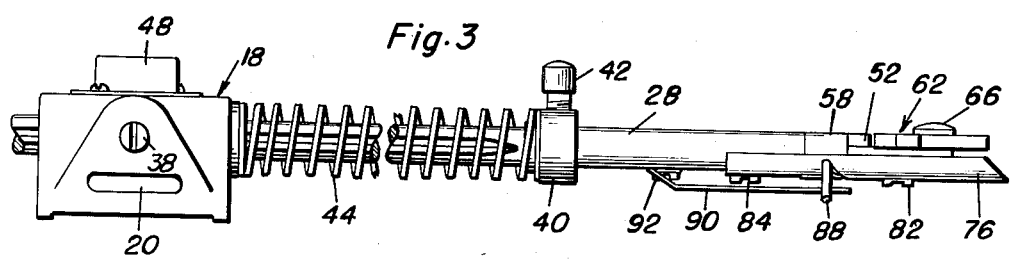
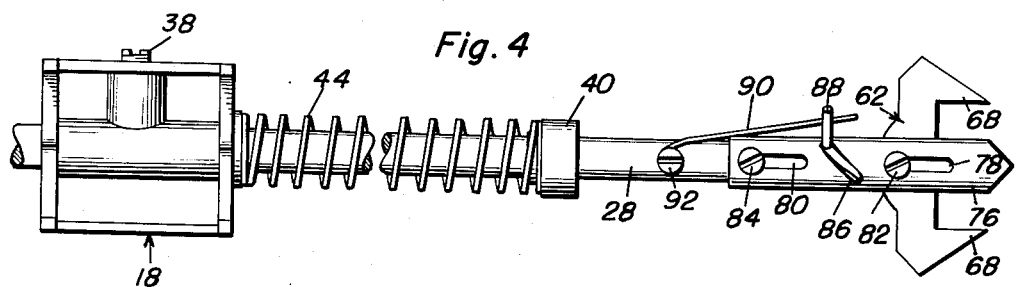
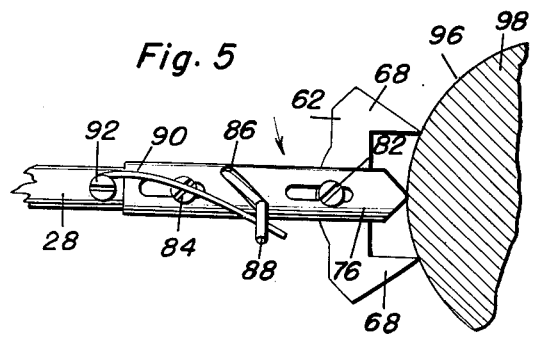
Henry A. Roy, Sr.
INVENTOR.

Patented Mar. 2, 1954

2,670,638

UNITED STATES PATENT OFFICE 2,670,638

DRILL AND REAMER GUIDE

Henry A. Roy, Sr., Devon, Conn.

Application April 13, 1953, Serial No. 348,316

7 Claims. (Cl. 77—55)

This invention relates in general to an improved drill and reamer guide and is a continuation-in-part of my application Serial Number 296,375, filed June 30, 1952. This application pertains to an improved head construtcion for a drill and reamer guide so as to facilitate the alignment of the guide with either a flat or rounded work surface.

Although there have been revised numerous types of drill guides for facilitating the drilling of holes and work pieces either at right angles to or at desired angles to the surface of such work pieces, there has not been provided a drill guide for drilling openings in work pieces having curved surfaces.

It is therefore the primary object of this invention to provide an improved drill and reamer guide which may be conveniently mounted on an electric drill for facilitating the drilling of holes in work pieces having curved surfaces at desired angles to such surfaces.

Another object of this invention is to provide an improved working gauging head for a drill and reamer guide, said head being so constructed and designed whereby the same may be utilized for aligning the drill and reamer guide relative to either a flat surface or an acute surface.

Another object of this invention is to provide an improved head construction for drill and reamer guide which is of a relatively simple design and formed of readily obtainable material so as to be economically feasible.

A further object of this invention is to provide an improved head for a drill and reamer guide which is intended to engage surfaces of work pieces to be drilled by a drill having the drill and reamer guide mounted thereon, said head construction being primarily intended for use with work pieces having rounded drilling surfaces but being so designed whereby the same may be utilized in aligning the drill and reamer guide with flat surfaces or work pieces to be drilled.

These together with other objects and advantages which will become subsequently apparent reside in the details of construction and operation as more fully hereinafter described and claimed, references being had to the accompanying drawings forming a part hereof, wherein like numerals refer to like parts throughout, and in which:

Figure 1 is a perspective view of a conventional electric drill having mounted thereon the improved drill and reamer guide which is the subject of this invention and shows the general configuration of the drill and reamer guide;

Figure 2 is an enlarged top plan view of the drill and reamer guide of Figure 1 and shows the general construction thereof, strap means for securing the guide to an electric drill being omitted and intermediate portions of a shaft and spring being omitted;

Figure 3 is a side elevational view of the drill and reamer guide of Figure 2;

Figure 4 is a bottom plan view of the drill and reamer guide of Figure 2;

Figure 5 is a bottom plan view of the forward end of the drill and reamer guide and shows the work engaging head thereof engaged with a work piece having a curved surface;

Figure 6 is an enlarged fragmentary sectional view taken substantially from the plane indicated by the section line 6—6 of Figure 2 and shows the general construction of the working gauge head of the drill and reamer guide; and, Figure 7 is an enlarged transverse sectional view taken substantially from the plane indicated by the section 7—7 of Figure 2 and shows the manner in which the shaft is slidably retained within its associated support and rotation thereof prevented.

Referring now to the drawings in detail, it is seen that it is illustrated a conventional electric drill which is referred to in general by the reference numeral 10. The electric drill 10 includes a body portion 12 to which is clamped by a suitable strap 14 the improved drill and reamer guide which is the subject of this invention, the drill and reamer guide being referred to in general by the reference numeral 16.

The drill and reamer guide 16 includes a generally rectangular support 18 having openings 20 in side walls thereof for reception of the ends of the straps 14. End walls of the support 18 also provided with V-shaped recesses 24 on the undersides to facilitate mounting thereof on various size electric drills.

The support 18 is provided with a longitudinally extending bore 26 in which is mounted an elongated shaft 28. The elongated shaft 28 is provided with a groove 30 on one side thereof. Engaged within the groove 30 is a ball 32 which is urged into position by a spring 34. The spring 34 is removably secured in a bore 36 receiving the ball 32 by an adjustable cap 38 closing the other end of the bore 36. It will be seen that the ball 32 permits longitudinal sliding of the shaft 28 through the bore 26 and at the same time prevents rotation thereof with respect to the support 18.

Carried by the forward portion of the shaft 28 and adjustably secured thereon is a collar 40. The collar 40 is retained in an adjusted position on the shaft 28 by a set screw 42.

Carried by the shaft 28 intermediate the collar 40 and the support 18 and engaging the two is an elongated coil spring 44. It is understood that the groove 30 does not extend the full length of the shaft 28 and that the same terminates forwardly on the rear end thereof. In this manner the ball 32 retains the rear portion of the shaft 28 within the support 18 against the forward urging of the spring 44. It is to be understood that the collar 40 is so positioned whereby portions of the drill and reamer guide 16 are normally disposed in a position forward of a drill 46 carried by the electric drill 10.

In order that the axis of the drill 10 may be retained in a horizontal plane, there is secured to the upper surface of the support 18, a spirit level 48. The spirit level is of a conventional construction and need not be explained in more detail.

Disposed at the forward end of the shaft 28 is a work engaging head which is referred to in general by the reference numeral 50. The work engaging head 50 includes a circular cross sectional extension 52. The extension 52 has a rear portion 54 of reduced cross section which is disposed within a longitudinal bore 56 in the forward end of the shaft 28. Mounted on the rear portion 54 and disposed between the forward end of the shaft 28 and an intermediate portion of the extension 52 is a collar 58, the collar being rotatable about the rear portion 54.

The upper part of the forward portion of the extension 52 is removed to provide a flat seat 60 on which is seated a bifurcated work engaging member 62. The work engaging member 62 includes a web 64 which is pivotally connected to the forward portion of the extension 52 by a removable pivot pin 66. The bifurcated member also includes a pair of forwardly extending legs 68 which terminate in work engaging points.

The web 64 of the bifurcated member 62 includes a rearwardly projecting sectional portion 70 on which is provided suitable indicia 72. The indicia 72 is alignable with an indicating mark 74 on the intermediate portion of the extension 52. The indicia 72 is marked in degrees and indicates the angle the bifurcated member 62 is disposed with respect to the longitudinal axis of the shaft 28.

Secured to the underside of both the extension 52 and the forward end of the shaft 28 is an elongated, centrally located leg 76. The leg 76 is semi-annular in cross section and has a pointed forward end. As is best illustrated in Figure 4, the central leg 76 is provided with a pair of longitudinally spaced elongated slots 78 and 80. Disposed intermediately slots 78 and 80 is a spiral slot 86. The spiral slot 86 has projecting therethrough a pin 88 which is carried by the underside of the collar 58. Engaged with the pin 88 is an elongated spring arm 90 which is secured to the shaft 28 by a fastener 92. It will be noted that the spring arm 90 rotates the pin 88 in such a manner so as to urge the central leg 76 to its forwardmost position.

When the central leg 76 is in its forwardmost position, the pointed end thereof is positioned forwardly of the pointed ends of the legs 68. When the pointed end of the central leg 76 engages the surface of the work piece, the pressure exerted thereon causes rearward movement of the central leg 76. The central leg 76 then moves rearwardly until the legs 68 of the bifurcated member 62 engages a work piece. The collar 58 is provided with an indicating mark 94 which is so positioned on the collar that when the point of the central leg 76 is in alignment with the points of the leg 68, the indicating mark 94 is longitudinally aligned with the indicating mark 74 when the central portion of the indicating indicia 72 is aligned with the indicating marks 74 and 94, it indicates that the drill and reamer guides 16 is disposed at right angles to the flat surface of the work piece to be drilled. It is understood that the shaft 28 moves rearwardly through the support 18 so that the drill 46 may engage the surface to be drilled and a hole bored therein.

Referring now to Figure 5 in particular, it is seen that when a curved surface, such as the surface 96 of a work piece 98 is engaged by the work engaging head 50, the pointed end of the central leg 76 is moved rearwardly of the pointed ends of the legs 68. The indicating mark 94 is then disregarded and the shaft 28 is positioned normal to the surface 96 through the use of the indicating mark 74 and the indicating indicia 72.

It is understood that in addition to facilitate the positioning of a shaft 28 normal to the surface of a work piece, the indicating indicia 72 may be utilized to dispose the shaft 28 and the longitudinal axis of the electric drill 10 at a desired angle to the surface of a work piece. It will be understood that the angular relationship may be obtained regardless of whether the surface of the work piece is flat or acute through the provision of the slidable central leg 76.

In view of the foregoing, it is seen that it has been illustrated and described an improved drill and reamer guide which may be utilized in combination with an electric drill or other rotary tools whereby the working gauging portion of the tool may be disposed at the desired angle to a working gauging surface. It is to be understood that the head 50, while it is primarily intended for use with curved surfaces, may be utilized for the indication of the head being engaged with a flat surface.

From the foregoing, the construction and operation of device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A drill and reamer guide for electric drills comprising a support securable to said drill, a shaft slidably supported by said support and spring urged away from said support, a work engaging head carried at a forward end of said shaft, said work engaging head including a bifurcated member pivotally mounted with respect to said shaft, a central work engageable leg slidably carried by said shaft between legs of said bifurcated member.

2. A drill and reamer guide for electric drills comprising a support securable to said drill, a shaft slidably supported by said support and spring urged away from said support, a work engaging head carried at a forward end of said shaft, said work engaging head including a bifurcated member pivotally mounted with respect to said shaft, a central work engageable leg slidably carried by said shaft between legs of said bifurcated member, cooperating indicating means on said bifurcated member and associated with said central leg for positioning said shaft relative to a curved surface of a work piece.

3. A drill and reamer guide for electric drills comprising a support securable to said drill, a shaft slidably supported by said support and spring urged away from said support, a work engaging head carried at a forward end of said shaft, said work engaging head including a bifurcated member pivotally mounted with respect to said shaft, a central work engageable leg slidably carried by said shaft between legs of said bifurcated member, a collar rotatably mounted at the forward end of said shaft, said collar being rotated in response to longitudinally sliding of said central leg, cooperating indicating means on said collar and said bifurcated member.

4. A drill and reamer guide for electric drills comprising a support securable to said drill, a shaft slidably supported by said support and spring urged away from said support, a work engaging head carried at a forward end of said shaft, said work engaging head including a bifurcated member pivotally mounted with respect to said shaft, a central work engageable leg slidably carried by said shaft between legs of said bifurcated member, a collar rotatably mounted at the forward end of said shaft, said collar being rotatable in response to longitudinally sliding of said central leg, cooperating indicating means on said collar and said bifurcated member, said bifurcated member and said collar being carried by an extension of said shaft, indicia on said extension cooperating with said indicia on said collar and said bifurcated member.

5. A drill and reamer guide for electric drills comprising a support securable to said drill, a shaft slidably supported by said support and spring urged away from said support, a work engaging head carried at a forward end of said shaft, said work engaging head including a bifurcated member pivotally mounted with respect to said shaft, a central work engageable leg slidably carried by said shaft between legs of said bifurcated member, said central leg being normally retained in a forward position by spring means carried by said shaft.

6. A drill and reamer guide for electric drills comprising a support securable to said drill, a shaft slidably supported by said support and spring urged away from said support, a work engaging head carried at a forward end of said shaft, said work engaging head including a bifurcated member pivotally mounted with respect to said shaft, a central work engageable leg slidably carried by said shaft between legs of said bifurcated member, said bifurcated member being carried by an extension of said shaft, a collar rotatably carried by said extension, said collar being connected to said central leg for rotation in response to longitudinal movement of said central leg, cooperating indicia on said collar and said extension for indicating alignment of free ends of said central leg and said legs of said bifurcated member.

7. A drill and reamer guide for electric drills comprising a support securable to said drill, a shaft slidably supported by said support and spring urged away from said support, a work engaging head carried at a forward end of said shaft, said work engaging head including a bifurcated member pivotally mounted with respect to said shaft, a central work engageable leg slidably carried by said shaft between legs of said bifurcated member, said bifurcated member being carried by an extension of said shaft, a collar rotatably carried by said extension, said collar being connected to said central leg for rotation in response to longitudinal movement of said central leg, cooperating indicia on said collar and said extension for indicating alignment of free ends of said central leg and said legs of said bifurcated member, said central leg being normally retained in a forward position by spring means carried by said shaft.

HENRY A. ROY, Sr.

References Cited in the file of this patent

UNITED STATES PATENTS

| Number | Name | Date |
|---|---|---|
| 20,469 | Daggett | June 1, 1858 |
| 1,929,585 | Henry | Oct. 10, 1933 |